US012472495B2

(12) United States Patent
Espinosa et al.

(10) Patent No.: US 12,472,495 B2
(45) Date of Patent: Nov. 18, 2025

(54) MICROFLUIDIC DEVICE FOR LIVE CELL MANIPULATION AND ANALYSIS

(71) Applicant: NORTHWESTERN UNIVERSITY, Evanston, IL (US)

(72) Inventors: Horacio Dante Espinosa, Winnetka, IL (US); Milan Mrksich, Hinsdale, IL (US); Prithvijit Mukherjee, Evanston, IL (US); Eric Jason Berns, Naperville, IL (US); Cesar Andres Patino, Evanston, IL (US)

(73) Assignee: Northwestern University, Evanston, IL (US)

( * ) Notice: Subject to any disclaimer, the term of this patent is extended or adjusted under 35 U.S.C. 154(b) by 47 days.

(21) Appl. No.: 17/511,246

(22) Filed: Oct. 26, 2021

(65) Prior Publication Data
US 2022/0126292 A1     Apr. 28, 2022

Related U.S. Application Data

(60) Provisional application No. 63/106,680, filed on Oct. 28, 2020.

(51) Int. Cl.
*B01L 3/00*     (2006.01)

(52) U.S. Cl.
CPC ... *B01L 3/502715* (2013.01); *B01L 3/502707* (2013.01); *B01L 3/502753* (2013.01);
(Continued)

(58) Field of Classification Search
CPC ......... B01L 2200/12; B01L 2300/0663; B01L 2300/0829; B01L 2300/0887;
(Continued)

(56) References Cited

U.S. PATENT DOCUMENTS

| 2005/0153273 A1* | 7/2005 | Wiksmo | G01N 33/5005 435/287.1 |
| 2009/0053813 A1* | 2/2009 | Evans | C12M 35/02 435/173.6 |

(Continued)

OTHER PUBLICATIONS

Mrksich "Mass Spectrometry of Self-Assembled Monolayers: A New Tool for Molecular Surface Science" ACS Nano. Jan. 2008; 2(1): 7-18. (Year: 2008).*

(Continued)

*Primary Examiner* — Jennifer Wecker
*Assistant Examiner* — Jonathan Bortoli
(74) *Attorney, Agent, or Firm* — Benesch, Friedlander, Coplan & Aronoff LLP

(57) ABSTRACT

A cell analysis system includes a multi-layer microfluidic device that includes a layer of microfluidic channels, a layer of microwells, a membrane with nanochannels, and a layer of extraction chambers. The microwells and the membrane are configured to allow culturing of cells that are adhered to the membrane or suspended in the microwells, and the membrane is configured to allow diffusion of substances across the membrane into the layer of extraction chambers. The cell analysis system includes a top conductive layer and a bottom conductive layer on the opposite sides of the multi-layer microfluidic device. The cell analysis system also includes a function generator configured to apply an electroporation pulse between the top conductive layer and the bottom conductive layer.

11 Claims, 12 Drawing Sheets

(52) U.S. Cl.
CPC ... *B01L 2200/12* (2013.01); *B01L 2300/0663* (2013.01); *B01L 2300/0829* (2013.01); *B01L 2300/0887* (2013.01); *B01L 2300/123* (2013.01); *B01L 2300/16* (2013.01)

(58) Field of Classification Search
CPC ........... B01L 2300/123; B01L 2300/16; B01L 3/502707; B01L 3/502715; B01L 3/502753; B01L 3/5085; C12M 23/12; C12M 23/16; C12M 25/02; C12M 25/04; C12M 35/02; G01N 33/5008
See application file for complete search history.

(56) References Cited

U.S. PATENT DOCUMENTS

| | | | | |
|---|---|---|---|---|
| 2010/0261159 | A1* | 10/2010 | Hess | B01J 19/0046 435/7.1 |
| 2012/0231517 | A1* | 9/2012 | Saez | C12N 15/87 977/773 |
| 2012/0276573 | A1* | 11/2012 | VanDersarl | B82Y 40/00 977/743 |
| 2013/0148126 | A1* | 6/2013 | Walters | B82Y 20/00 356/445 |
| 2017/0088880 | A1* | 3/2017 | Brettschneider | C12Q 1/6806 |
| 2017/0175139 | A1* | 6/2017 | Wu | C12N 15/87 |
| 2018/0010149 | A1* | 1/2018 | Mazur | C12M 35/02 |
| 2018/0257069 | A1* | 9/2018 | Bercovici | F16K 99/0042 |
| 2018/0258379 | A1* | 9/2018 | Zahn | G01N 15/1031 |

OTHER PUBLICATIONS

Van Hest ("Titanium-doped indium oxide: A high-mobility transparent conductor") Appl. Phys. Lett. Jul. 18, 2005; 87 (3): 032111 (Year: 2005).*
S. M. Prakadan et al., "Scaling by shrinking: empowering single-cell 'omics' with microfluidic devices", Nature Reviews Genetics, 2017, 18, 345-361.
M. P. Stewart et al., "In vitro and ex vivo strategies for intracellular delivery", Nature, 2016, 538, 183-192.
W. Qin et al., "Efficient CRISPR/Cas9-Mediated Genome Editing in Mice by Zygote Electroporation of Nuclease", Genetics, 2015, 200, 423-430.
R. Yang et al., "Monoclonal Cell Line Generation and CRISPR/Cas9 Manipulation via Single-Cell Electroporation", Small, 2018, 14, 1702495.
H. D. Espinosa et al., "Nanofountain Probe Electroporation for Monoclonal Cell Line Generation", in Electroporation Protocols: Microorganism, Mammalian System, and Nanodevice, eds. S. Li, L. Chang and J. Teissie, Springer US, New York, NY, 2020, DOI: 10.1007/978-1-4939-9740-4_6, pp. 59-68.
D. Balboa et al., "Conditionally Stabilized dCas9 Activator for Controlling Gene Expression in Human Cell Reprogramming and Differentiation", Stem cell reports, 2015, 5, 448-459.
E. Neumann et al., "Gene transfer into mouse lyoma cells by electroporation in high electric fields", The EMBO journal, 1982, 1, 841-845.
J. Gehl, "Electroporation: theory and methods, perspectives for drug delivery, gene therapy and research", Acta Physiologica Scandinavica, 2003, 177, 437-447.
A. Sharei et al., "A vector-free microfluidic platform for intracellular delivery", Proceedings of the National Academy of Sciences, 2013, 110, 2082-2087.
A. Adamo et al., "Microfluidic based single cell microinjection", Lab on a Chip, 2008, 8, 1258-1261.
H. G. Dixit et al., "Massively-Parallelized, Deterministic Mechanoporation for Intracellular Delivery", Nano Letters, 2020, 20, 860-867.
O. Y. Loh et al., "Electric field-induced direct delivery of proteins by a nanofountain probe", Proceedings of the National Academy of Sciences, 2008, 105, 16438-16443.
W. Kang et al., et al., "Microfluidic device for stem cell differentiation and localized electroporation of postmitotic neurons", Lab on a Chip, 2014, 14, 4486-4495.
P. Mukherjee et al., "Combined Numerical and Experimental Investigation of Localized Electroporation-Based Cell Transfection and Sampling", ACS Nano, 2018, 12, 12118-12128.
J. P. Giraldo-Vela et al., "Single-Cell Detection of mRNA Expression Using Nanofountain-Probe Electroporated Molecular Beacons", Small, 2015, 11, 2386-2391.
S. G. Higgins et al., "Extracting the contents of living cells", Science, 2017, 356, 379-380.
B. P. Nadappuram et al., "Nanoscale tweezers for single-cell biopsies", Nat Nanotechnol, 2019, 14, 80-88.
J. C. Caicedo et al., "Nucleus segmentation across imaging experiments: the 2018 Data Science Bowl", Nature methods, 2019, 16, 1247-1253.
P. Mukherjee et al., "Temporal Sampling of Enzymes from Live Cells by Localized Electroporation and Quantification of Activity by SAMDI Mass Spectrometry", Small, 2020, n/a, 2000584.
E. H. Mouly et al., "Label-Free Assay of Protein Tyrosine Phosphatase Activity in Single Cells", Analytical Chemistry, 2019, 91, 13206-13212.
N. Bowden et al., "Spontaneous formation of ordered structures in thin filmsofmetals supported on an elastomeric polymer", Nature, 1998, 393, 146-149.
W. M. Choi et al., "Biaxially Stretchable "Wavy" Silicon Nanomembranes", Nano Letters, 2007, 7, 1655-1663.
S. P. Lacour et al., "Stretchable gold conductors on elastomeric substrates", Applied physics letters, 2003, 82, 2404-2406.
J. C. Caicedo et al., "Data-analysis strategies for image-based cell profiling", Nature Methods, 2017, 14, 849-863.
I. Byun et al., "Transfer of thin Au films to polydimethylsiloxane (PDMS) with reliable bonding using (3-mercaptopropyl) trimethoxysilane (MPTMS) as a molecular adhesive", Journal of Micromechanics and Microengineering, 2013, 23, 085016.
S. Patankar, "Numerical heat transfer and fluid flow", CRC press, 1980.
W. H. Grover et al., "Measuring single-cell density", Proceedings of the National Academy of Sciences, 2011, 108, 10992-10996.
A. Ostman et al., "Protein-tyrosine phosphatases and cancer", Nat. Rev. Cancer 2006, 6, 307.
D. P. Labbe et al., "Protein Tyrosine Phosphatases in Cancer: Friends and Foes!", Prog. Mol. Biol. Transl. Sci. 2012, 106, 253.
P. Actis et al., "Compartmental Genomics in Living Cells Revealed by Single-Cell Nanobiopsy", ACS Nano 2014, 8, 546.
O. Guillaume-Gentil et al., "Tunable Single-Cell Extraction for Molecular Analyses", Cell 2016, 166, 506.
W. Kang et al., "Microfluidic device for stem cell differentiation and localized electroporation of postmitotic neurons", Lab Chip 2014, 14, 4486.
P. Mukherjee et al., "Combined Numerical and Experimental Investigation of Localized Electroporation-Based Cell Transfection and Sampling", ACS Nano 2018, 12, 12118.
Y. Cao et al., "Nontoxic nanopore electroporation for effective intracellular delivery of biological macromolecules", Proc. Natl. Acad. Sci. U. S. A. 2019, 116, 7899.
S. S. P. Nathamgari et al., "Localized electroporation with track-etched membranes", Proc. Natl. Acad. Sci. U. S. A. 2019, 116, 22909.
Y. Cao et al., "Nondestructive nanostraw intracellular sampling for longitudinal cell monitoring", Proc. Natl. Acad. Sci. U. S. A. 2017, 114, E1866.
M. Mrksich, "Mass Spectrometry of Self-Assembled Monolayers: A New Tool for Molecular Surface Science", ACS Nano 2008, 2, 7.
T. Kotnik et al., "Electroporation-based applications in biotechnology", Trends Biotechnol. 2015, 33, 480.
M. L. Yarmush et al., "Electroporation-Based Technologies for Medicine: Principles, Applications, and Challenges", Annu. Rev. Biomed. Eng. 2014, 16, 295.
W. Kang et al., Nanofountain Probe Electroporation (NFP-E) of Single Cells, Nano Lett. 2013, 13, 2448.

(56) References Cited

OTHER PUBLICATIONS

P. E. Boukany et al., "Nanochannel electroporation delivers precise amounts of biomolecules into living cells", Nat. Nanotechnol. 2011, 6, 747.

Y. Cao et al., "Universal intracellular biomolecule delivery with precise dosage control", Sci. Adv. 2018, 4, eaat8131.

W. Kang et al., Micro-and Nanoscale Technologies for Delivery into Adherent Cells, Trends Biotechnol. 2016, 34, 665.

L. Chang et al., "Micro-/nanoscale electroporation", Lab Chip 2016, 16, 4047.

G. He et al., "Hollow Nanoneedle-Electroporation System To Extract Intracellular Protein Repetitively and Nondestructively", ACS Sens. 2018, 3, 1675.

J. Su et al., "Using Mass Spectrometry to Characterize Self-Assembled Monolayers Presenting Peptides, Proteins, and Carbohydrates", Angew. Chem. 2002, 41, 4715.

H. D. Min et al., "Profiling Kinase Activities by Using a Peptide Chip and Mass Spectrometry", Angew. Chem. Int. Ed. Engl. 2004, 43, 5973.

L. C. Szymczak et al., "Combining SAMDI Mass Spectrometry and Peptide Arrays to Profile Phosphatase Activities" Methods Enzymol. 2018, 607, 389.

Z. A. Gurard-Levin et al., "Peptide Arrays Identify Isoform-Selective Substrates for Profiling Endogenous Lysine Deacetylase Activity", ACS Chem. Biol. 2010, 5, 863.

L. Ban et al., "Discovery of glycosyltransferases using carbohydrate arrays and mass spectrometry", Nat. Chem. Biol. 2012, 8, 769.

J. Su et al., "Assays of Endogenous Caspase Activities: A Comparison of Mass Spectrometry and Fluorescence Formats", Anal. Chem. 2006, 78, 4945.

S. E. Wood et al., "A Bottom-Up Proteomic Approach to Identify Substrate Specificity of Outer-Membrane Protease OmpT", Angew. Chem. Int. Ed. Engl. 2017, 56, 16531.

C. L. Crespi et al., "Fluorometric screening for metabolism-based drug-drug interactions", Journal of Pharmacological and Toxicological Methods 2000, 44, 325.

M. C. Maillard et al., "A Label-Free LC/MS/MS-Based Enzymatic Activity Assay for the Detection of Genuine Caspase Inhibitors and SAR Development", Journal of Biomolecular Screening, 2013, 18, 868.

J. M. Karlsson et al., "Fabrication and transfer of fragile 3D PDMS microstructures", J. Micromech. Microeng. 2012, 22, 085009.

M. P. Stewart et al., "Intracellular Delivery by Membrane Disruption: Mechanisms, Strategies, and Concepts", Chem. Rev. 2018, 118, 7409.

T. C. Meng et al., "Reversible Oxidation and Inactivation of Protein Tyrosine Phosphatases In Vivo", Mol. Cell 2002, 9, 387.

A. Östman et al., "Regulation of protein tyrosine phosphatases by reversible oxidation",J. Biochem. 2011, 150, 345.

N. Krishnan, et al., "Harnessing insulin-and leptin-induced oxidation of PTP1B for therapeutic development", Nat. Commun. 2018, 9, 283.

A. Alonso, "Protein Tyrosine Phosphatases in the Human Genome", et al., Cell 2004, 117, 699.

L. C. Szymczak, et al., "Using Peptide Arrays to Profile Phosphatase Activity in Cell Lysates", Chemistry 2020, 26, 165.

S. Halldorsson, et al., "Advantages and challenges of microfluidic cell culture in polydimethylsiloxane devices", Biosens. Bioelectron. 2015, 63, 218.

T. Ditommaso, et al., "Cell engineering with microfluidic squeezing preserves functionality of primary immune cells in vivo", Proc. Natl. Acad. Sci. U. S. A. 2018, 115, E10907.

S. Kim, et al., "Highly efficient RNA-guided genome editing in human cells via delivery of purified Cas9 ribonucleoproteins", Genome Res. 2014, 24, 1012.

D. Kim, et al., "Generation of Human Induced Pluripotent Stem Cells by Direct Delivery of Reprogramming Proteins", Cell Stem Cell 2009, 4, 472.

A. Wittrup, et al., "Knocking down disease: a progress report on siRNA therapeutics", Nat. Rev. Genet. 2015, 16, 543.

T. L. Roth, et al., "Reprogramming human T cell function and specificity with non-viral genome targeting", Nature 2018, 559, 405.

J. Liu, et al., "Efficient delivery of nuclease proteins for genome editing in human stem cells and primary cells", Nat. Protoc. 2015, 10, 1842.

S. E. Howden, et al., "Simultaneous reprogramming and gene editing of human fibroblasts", Nat. Protoc. 2018, 13, 875.

M. P. Stewart, et al., "In vitro and ex vivo strategies for intracellular delivery", Nature 2016, 538, 183.

A. D. Edelstein, et al., "Advanced methods of microscope control using uManager software", J. Biol. Methods 2014, 1, e10.

J. Schindelin, et al., "Fiji: an open-source platform for biological-image analysis", Nat. Methods 2012, 9, 676.

* cited by examiner

A. Flexible electrode fabrication fabr. PDMS stencil sputter deposition Au-Ti cooling and buckling of Au-Ti 104, 106

MICROFLUIDIC DEVICE FOR LIVE CELL MANIPULATION AND ANALYSIS

CROSS-REFERENCE TO RELATED APPLICATIONS

The present application claims the benefit of priority under 35 U.S.C. § 119 from U.S. Provisional Patent Application No. 63/106,680 entitled "Microfluidic Device for Live Cell Manipulation and Analysis," filed on Oct. 28, 2020, the disclosure of which is hereby incorporated by reference in its entirety for all purposes.

STATEMENT OF FEDERALLY FUNDED RESEARCH OR SPONSORSHIP

This invention was made with government support under grant numbers CA199091 and GM132709 awarded by the National Institutes of Health. The government has certain rights in the invention.

RELATED TECHNOLOGY

The present disclosure relates to cell analysis, and more specifically relates to microfluidic platform for manipulation and analysis of live cells.

BACKGROUND

Conventional methods for investigating single biological cells rely on lysis, where the cell membrane is destroyed to extract and analyze the internal contents. However, this approach is destructive and can only provide information about cells at end points. Therefore, it would be beneficial to develop systems and methods to allow investigation of dynamic cellular processes non-destructively.

SUMMARY

In order to investigate dynamic cellular processes, new techniques are developed that can non-destructively analyze intracellular contents at multiple time-points without disrupting the functioning of the cells. The present disclosure describes a microfluidic technology (the Live Cell Analysis Device or LCAD) that uses electric pulses to open pores temporarily in the cell membrane, allowing for their internal contents to leak out to small chambers having nano-liter volumes. The extracted contents can then be analyzed using a wide range of bio-sensors. Since the cell membrane heals after the application of the electric pulses, the process is non-destructive and minimally affects cell functioning. This process can then be repeated at multiple time instances to analyze intracellular contents from live cells and investigate dynamic cellular behavior. The LCAD also allows for perturbation of cells by introduction of external molecular cargo into cells or treatment of cells using drugs and factors. This enables investigation of temporal cellular behavior in response to a variety of external inputs.

In one embodiment, a cell analysis system includes a multi-layer microfluidic device that includes a layer of microfluidic channels, a layer of microwells, a membrane with nanochannels, and a layer of extraction chambers. The microwells and the membrane are configured to allow culturing of cells that are adhered to the membrane or suspended in the microwells, and the membrane is configured to allow diffusion of substances across the membrane into the layer of extraction chambers. The cell analysis system includes a top conductive layer and a bottom conductive layer on the opposite sides of the multi-layer microfluidic device. The cell analysis system also includes a function generator configured to apply an electroporation pulse between the top conductive layer and the bottom conductive layer.

In one embodiment, a method of fabricating a multi-layer microfluidic device includes forming a layer of microfluidic channels and a layer of microwells and coating a gold layer on top of the microwells to form a layer of gold coated microwells, and forming a layer of extraction chambers. The method includes bonding the layer of gold coated microwells with the layer of microfluidic channels, wherein the gold layer is between the microfluidic channels and the microwells. The method also includes bonding a membrane containing nanochannels with the layer of gold coated microwells and with the layer of extraction chambers. The layer of microfluidic channels, the layer of microwells, the membrane, and the layer of extraction chambers are aligned such that through-holes of the extraction chambers are substantially concentric to through-holes of the layer of microwells.

In another embodiment, a method of cell analysis includes introducing cells into a multi-layer microfluidic device, wherein the multi-layer microfluidic device includes a layer of microfluidic channels, a layer of microwells, a membrane with nanochannels, and a layer of extraction chambers. The method includes introducing a cell culture media to the cells, electroporating the cells, and temporally sampling molecules extracted from the cells.

BRIEF DESCRIPTION OF THE DRAWINGS

The accompanying figures, which are incorporated in and constitute a part of the specification, illustrate various example configurations and data, and are used merely to illustrate various example embodiments. In the figures, like elements bear like reference numerals.

DETAILED DESCRIPTION

Figure 1:
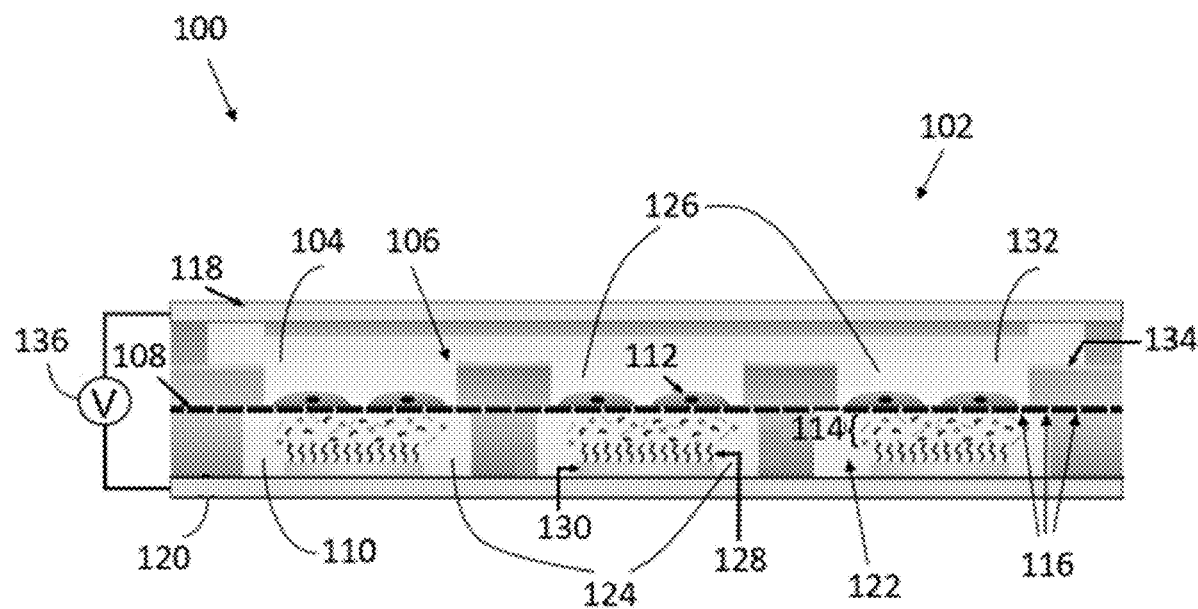
FIG. 1 shows a schematic of an example of a cell analysis system including a multi-layer microfluidic device or LCAD.

The present disclosure describes a microfluidic platform for manipulation and analysis of live cells by delivering molecules or extracting and analyzing their internal contents at multiple timepoints without killing the cells.

Conventional methods for investigating single biological cells rely on lysis, where the cell membrane is destroyed to extract and analyze the internal contents. The conventional approach is destructive and can only provide information about cells at end points. In order to investigate dynamic cellular processes, new techniques are developed and discussed herein that can non-destructively analyze intracellular contents at multiple time-points without disrupting the functioning of the cells.

The present disclosure is directed to a microfluidic technology (the Live Cell Analysis Device or LCAD) that uses electric pulses to open pores temporarily in the cell membrane, allowing for their internal contents to leak out to small chambers having nano-liter volumes. The extracted contents can then be analyzed using a wide range of biosensors. Since the cell membrane heals after the application of the electric pulses, the process is non-destructive and minimally affects cell functioning. This process can then be repeated at multiple time instances to analyze intracellular contents from live cells and investigate dynamic cellular behavior. The LCAD also allows for perturbation of cells by introduction of external molecular cargo into cells or treatment of cells using drugs and factors. This enables investigation of temporal cellular behavior in response to a variety of external inputs. In addition, the microfluidic environment created using micro-wells of the LCAD provides a means for long term cell culture, monitoring and analysis.

The present disclosure allows study of dynamic cell-cell signaling in immune response, study of dynamic cellular response to external perturbations, and study of dynamic cellular processes.

Study of dynamic cell-cell signaling in immune response may be accomplished by measuring secreted cytokines (e.g. from T-cells, B-cells dendritic cells etc.) and internal biomarkers using the LCAD disclosed herein. Cell-cell communication can be studied in the context of immune response to an antigen. This is useful for immunotherapy applications.

Study of dynamic cellular response to external perturbations may be accomplished using the LCAD disclosed herein, which can be perturbed either by introducing molecules, e.g., drugs or small molecules, permeable through the microfluidic channels or by transfection, e.g., clustered regularly interspaced short palindromic repeats (CRISPR) based genetic knockout/knockin. The dynamic cellular response can be studied by sampling secreted or internal biomarkers at multiple timepoints using the LCAD. This is useful for applications such as drug screening, disease modeling and cell line generation for discovery of genetic targets pertaining to diseases.

Study of dynamic cellular processes, e.g., dynamic cellular processes such as differentiation and development, drug response, disease progression and cell signaling, may be investigated by sampling cells at multiple timepoints and analyzing their internal contents. This has important applications in fundamental biology research such as understanding the mechanisms of growth, ageing and disease progression.

The present disclosure provides a technique for non-destructive analysis of intracellular contents. This allows for analysis of dynamic cellular processes without killing the cells. Conventional platforms generally rely on cell lysis and can carry out endpoint assays but this only provides information at a single timepoint. The present disclosure provides a platform for simultaneous perturbation of cells and assaying of cellular contents at multiple timepoints. Conventional methods do not combine perturbation and analysis on the same platform.

The present disclosure provides a means of non-destructively investigating dynamic processes in cells which are relevant to several diseases (e.g. immune response in cancers, progression of neurodegenerative diseases such as Alzheimer's etc.) and provides a new platform for discovery of novel genetic targets and drugs. This will be of high interest to the biotechnology and pharma industries.

The microfluidic platform (the Live Cell Analysis Device or LCAD) disclosed herein can culture a small cell population down to a single cell (1-200 cells) in micro-well arrays, deliver exogenous molecules (e.g. plasmids, mRNA, proteins and peptides) into them and extract cytosolic biomarkers (e.g. metabolites, mRNA and enzymes) using electroporation, while preserving cell viability. The present disclosure facilitates long-term on-chip culture and monitoring (through live cell imaging) of single cells or small cell populations (7 days), allows treatment of cells with various compounds (e.g. drugs) as well as delivery of impermeable biomolecules via localized electroporation with high efficiency, and enables extraction of intracellular biomarkers from live cells at multiple time points which are detected and quantified using a replaceable surface-based biosensor. In addition to biomarkers extracted via electroporation, secreted markers that diffuse out from the cells can also be detected using the same platform.

The present disclosure provides four-fold advantages. First, unlike end-point assays, the cells do not have to be lysed to sample intra-cellular biomarkers, allowing for the non-destructive investigation of the same cells at multiple time-points. This is achieved by using short voltage pulses to reversibly open pores on the cell membrane allowing for the diffusion of intracellular molecules out of the cell into a micro-well which are then detected using surface-based sensors. Second, the present disclosure provides an integrated platform to both transfect a population of single cells and observe their individual behavior by monitoring sampled or secreted biomarkers over time. Third, the LCAD may be configured to incorporate several rows of microwells addressed by microfluidic channels. This allows for multiplexing by treatment of individual rows of cells with different compounds followed by sampling to investigate the effect of the different treatments. Finally, the LCAD can interface with different surface-based sensors for analysis of the sampled intracellular contents (e.g. plasmonics, interferometry and fluorescence barcode or mass spectrometry-based assays that rely on surface binding of the molecule of interest). These unique capabilities of LCAD open several unprecedented opportunities in both basic research and pharmaceutical applications such as drug screening, stem-cell differentiation and cell-line generation.

FIG. 1 shows schematic of an example of a cell analysis system 100. The cell analysis system 100 includes a multi-layer microfluidic device or a Live Cell Analysis Device (LCAD) 102. The multi-layer microfluidic device or LCAD 102 includes a layer of microfluid channels 104, a layer of microwells 106, a membrane 108, and a layer of extraction chambers 110. The layer of microwells 106 and the membrane 108 are configured to allow culturing of cells 112 (e.g., live cells) that are adhered to the membrane 108 or suspended in the layer of microwells 106.

The layer of microfluidic channels 104, the layer of microwells 106, and the layer of extraction chambers 110 may be formed of polydimethylsiloxane. The layer of microfluidic channels 104, the layer of microwells 106, and the layer of extraction chambers 110 have dimensions that are suitable for culturing the cells 112. For example, the diameter of the microwells of the layer of microwells 106 is about 50 micrometers (μm) to about 350 μm depending on the number of cells cultured in each microwell. For example, the height of the microwells of the layer of microwells 106 is about 50 μm. For example, the diameter of the extraction chambers 110 is about 100 μm to about 400 μm depending on the number of cells (e.g., cells 112) in the layer of microwells 106 that is being assayed. For example, the height of the extraction chambers 110 is about 50 μm.

The membrane 108 is designed to allow delivery of the substances 114, e.g., biomolecules (proteins, RNA, plasmid DNA etc.), exogenous molecules, biomarkers, or the extraction of cytosolic markers (proteins, metabolites, RNA etc.) into the bottom microchambers, e.g., the layer of extraction chambers 110, via localized electroporation. The membrane 108 may be a polycarbonate (PC) membrane or a protein matrix coated (e.g. fibronectin, vitronectin, laminin etc. depending on cell type) PC membrane. The membrane 108 includes nanochannels 116 to allow diffusion of the substances 114.

The membrane 108 and the nanochannels 116 may have any suitable dimensions to allow delivery of the substances 114 and culturing of the cells 112. For example, the nanochannels 116 of the membrane 108 are about 100 nanometer (nm) to 400 nm in diameter and about 5 micrometers (μm) to about 25 μm in height. The nanochannels 116 may be distributed in any suitable density and distribution to allow delivery of the substances 114 and culturing of the cells 112. For example, the nanochannels 116 of the membrane 108 are distributed with a density that results in about 0.06% to about 15% of the attached cells (e.g., the cells 112) interfacing with the nanochannels 116. For example, the nanochannels 116 of the membrane 108 are distributed with a density between about $2\times10^6$ pores per centimeter squared (pores/cm$^2$) and about $5\times10^8$ pores/cm$^2$, e.g., with respect to the area of the membrane 108.

The cell analysis system 100 includes a top conductive layer 118 and a bottom conductive layer 120 configured to attach to the opposite sides of the multi-layer microfluidic device or LCAD 102. The top conductive layer 118 and the bottom conductive layer 120 may be made of indium titanium oxide (ITO). The top conductive layer 118 and/or the bottom conductive layer 120 may be removably attached to the layer of microfluid channels 104 and the layer of extraction chambers 110, respectively. In some embodiments, the top conductive layer 118 and the bottom conductive layer 120 are a part of the multi-layer microfluidic device or LCAD 102, e.g., the top conductive layer 118 and the bottom conductive layer 120 are fixedly attached to the layer of microfluid channels 104 and the layer of extraction chambers 110, respectively.

The layer of extraction chambers 110 includes microwells 122 with arrays of through-holes 124 that are substantially concentric with arrays of through-holes 126 of the layer of microwells 106. The layer of microwells 122 and the layer of extraction chambers 110 may be functionalized (e.g., a functionalized layer 128) using aminoethylaminopropyltrimethoxysilane.

The bottom conductive layer 120 may include one or more surface-based sensors 130. The one or more surface-based sensors 130 are disposed on, fixed on, adhered on, or attached to the bottom conductive layer 120. The one or more surface-based sensors 130 may be plasmon resonance based sensors. In some embodiments, the bottom conductive layer 120 includes gold (Au) patterns coated on the bottom conductive layer 120 made of ITO. In this embodiment, the gold patterns interface with the layer of extraction cambers 110 and act as the one or more surface-based sensors 130. In some embodiments, the layer of microfluidic channels 104 include a self-assembled monolayer desorption ionization mass spectrometry assay 132, and the bottom conductive layer 120 is an ITO coated slide with gold patterns interfacing with the extraction chambers 110.

The multi-layer microfluidic device or LCAD 102 may include a conductive layer 134 disposed on the microwells 106. The conductive layer 134 may be made of any suitable electrically conductive material, such as gold (Au). The conductive layer 134 may enhance electrical conductivity and minimize electric field losses in the channels. The conductive layer 134 may be in any suitable thickness to enhance electrical conductivity and minimize electric field losses in the channels. For example, the thickness of the conductive layer 134 is about 100 nanometers (nm).

The cell analysis system 100 includes a function generator 136 configured to apply an electroporation pulse between the top conductive layer 118 and the bottom conductive layer 120.

In practice, the multi-layer microfluidic device or LCAD 102 allows for cell seeding via the microfluidic channels 104 and long-term culture of adherent cells (e.g., the cells 112) in isolated microwells (e.g., the layer of microwells 106). The multi-layer microfluidic device or LCAD 102 enables the delivery of exogenous cargo into the live cells 112 as well as extraction and analysis of cytosolic contents from the live cells 112 while preserving their viability. A pulsed electric field is applied using the function generator 136 to the cells 112 via electrode layers, e.g., the top conductive layer 118 and the bottom conductive layer 120, that have a surface-based biosensor, e.g., the one or more surface-based sensors 130 on the bottom conductive layer 120.

The electropolation leads to formation of transient pores in the cell membrane areas collocated with the nanochannels 116, through which exogenous molecular cargo, e.g., the substances 114, is transported from the layer of extraction chambers 110 into the cells 112 or the cytosolic milieu is transported from the cells 112 to the layer of extraction chambers 110 interfacing with the sensor slide. The extracted contents (e.g., extracted cytosolic milieu in this case) can then be analyzed using various surface based assays.

In one embodiment, the extracted contents are analyzed using the sensor slide including the bottom conductive layer 120, which includes the one or more surface-based sensors 130 disposed on the bottom conductive layer 120.

In another embodiment, the extracted contents are analyzed using the sensor slide including the bottom conductive layer 120 made of ITO coated with gold (Au) patterns interfacing with the layer of extraction chambers 110. In this embodiment, the sensor slide serves the dual purpose of acting as an electrode and providing a surface for immobilization of the substrates. The substrates are used to carry out enzymatic reactions for the SAMDI-MS (Self Assembled Monolayer Desorption Ionization Mass Spectrometry) assay. The layer of extraction chambers 110 provides small reaction volumes of about 0.4 nanoliter (nl) to about 7 nl for the extracted intracellular enzymes to act on the substrates immobilized on the functionalized slide (e.g., the functionalized layer 128 functionalized using aminoethylaminopropyltrimethoxysilane. The enzymatic activity is then quantified using mass spectrometry.

Figure 2:
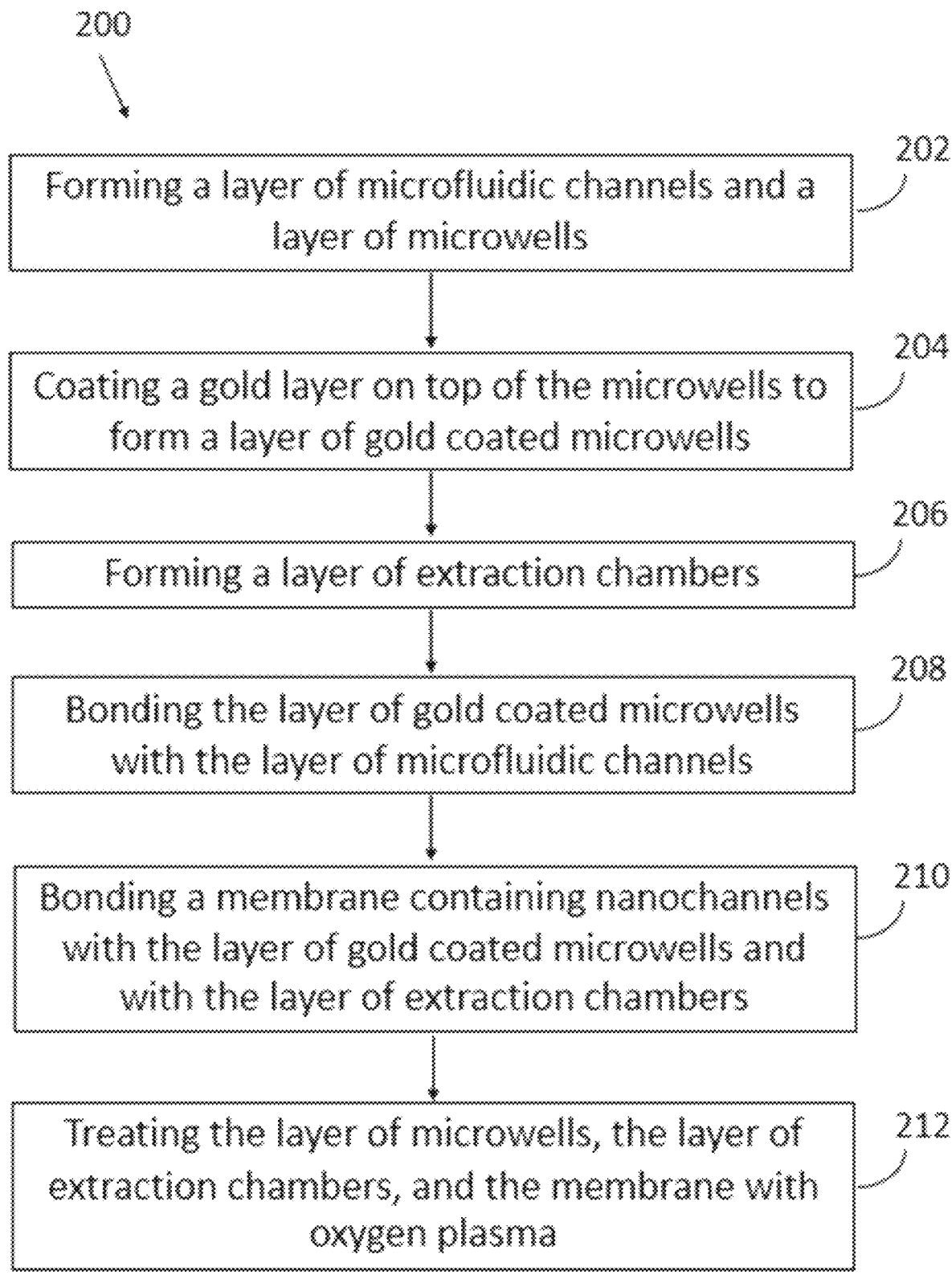
FIG. 2 shows an example method of making the multi-layer microfluidic device or LCAD of the cell analysis system of FIG. 1.

FIG. 2 shows an example method 200 of making the multi-layer microfluidic device or LCAD 102 of the cell analysis system 100 of FIG. 1. The method 200 includes forming a layer of microfluidic channels and a layer of microwells (step 202) and coating a gold layer on top of the microwells to form a layer of gold coated microwells (step 204). The method 200 includes forming a layer of extraction chambers (step 206) and bonding the layer of gold coated microwells with the layer of microfluidic channels (step 208). As shown in FIG. 1, the gold layer, e.g., the conductive layer 134, is between the layer of microfluidic channels 104 and the layer of microwells 106. The method 200 includes bonding a membrane containing nanochannels with the layer of gold coated microwells and with the layer of extraction chambers (step 210).

Different portions of the multi-layer microfluidic device or LCAD 102 are assembled such that the layer of microfluidic channels 104, the layer of microwells 106, the membrane 108, and the layer of extraction chambers 110 are aligned such that through-holes 124 of the extraction chambers 110 are substantially concentric to the through-holes 126 of the layer of microwells 106. The method 200 may include treating the layer of microwells 106, the layer of extraction chambers 110, and the membrane with oxygen plasma (step 212). In some embodiment, step 212 may be omitted.

Steps 202 and 206 may include using soft lithography of polydimethylsiloxane to form the layer of microfluidic channels 104, the layer of microwells 106, and the layer of extraction chambers 110. Steps 202 and 206 may include functionalizing the layer of microwells 106 and the layer of extraction chambers 110 using aminoethylaminopropyltrimethoxysilane.

Device Fabrication

Figure 3:
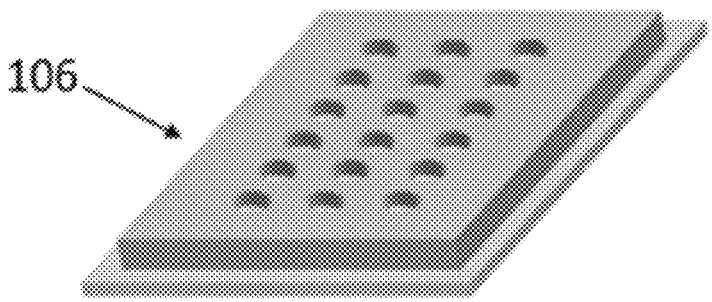
FIGS. 3-5 each shows an example fabrication step of making the multi-layer microfluidic device or LCAD of the cell analysis system of FIG. 1.
Figure 3:
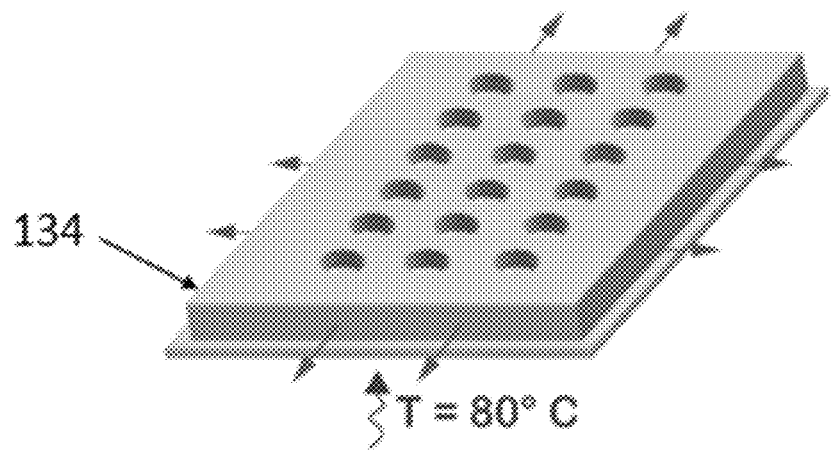
Figure 3:
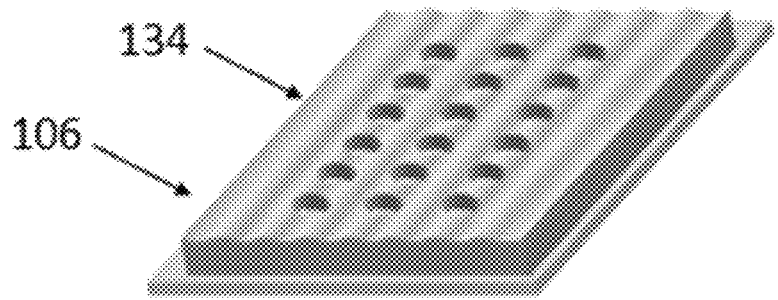
Figure 4:
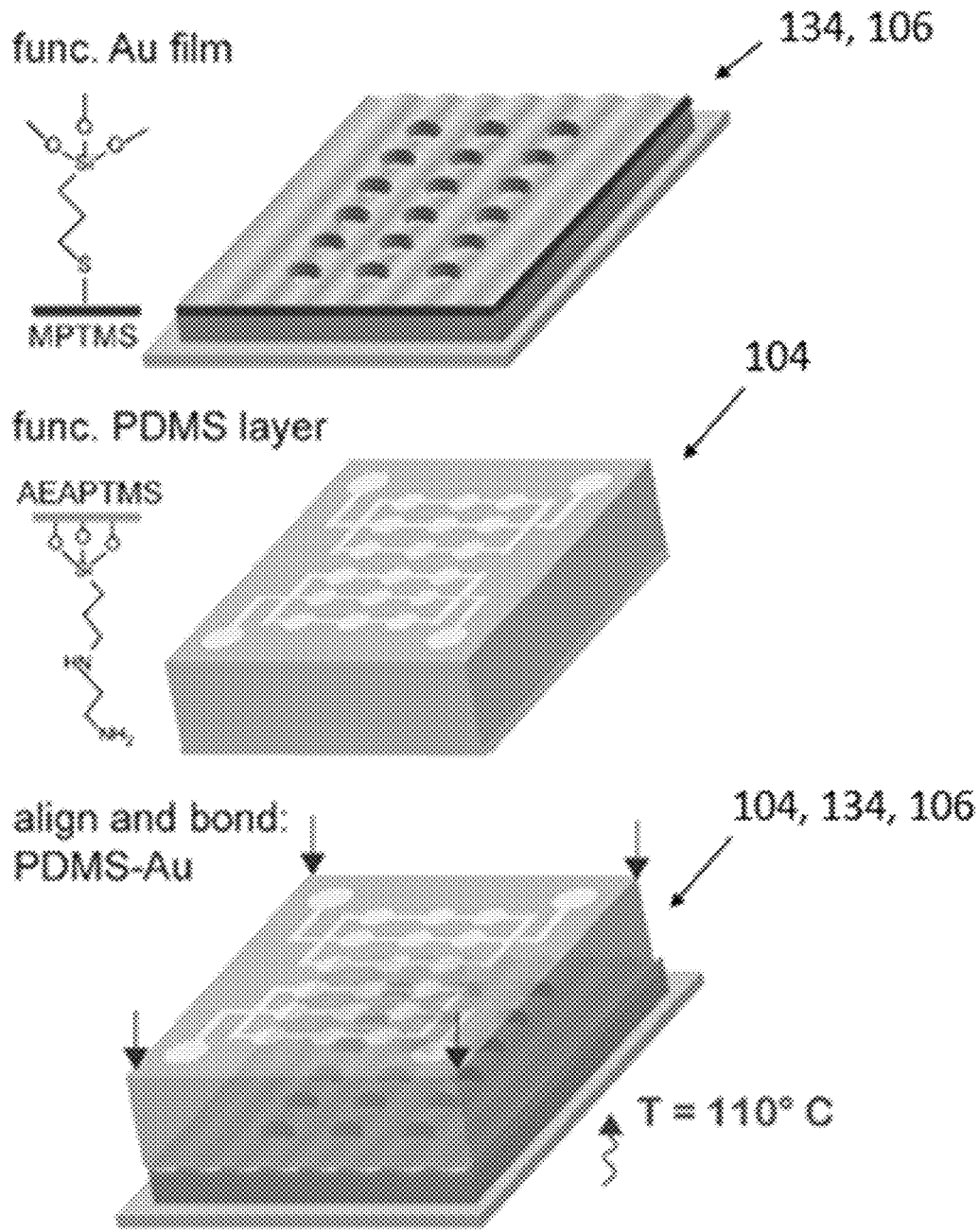
Figure 5:
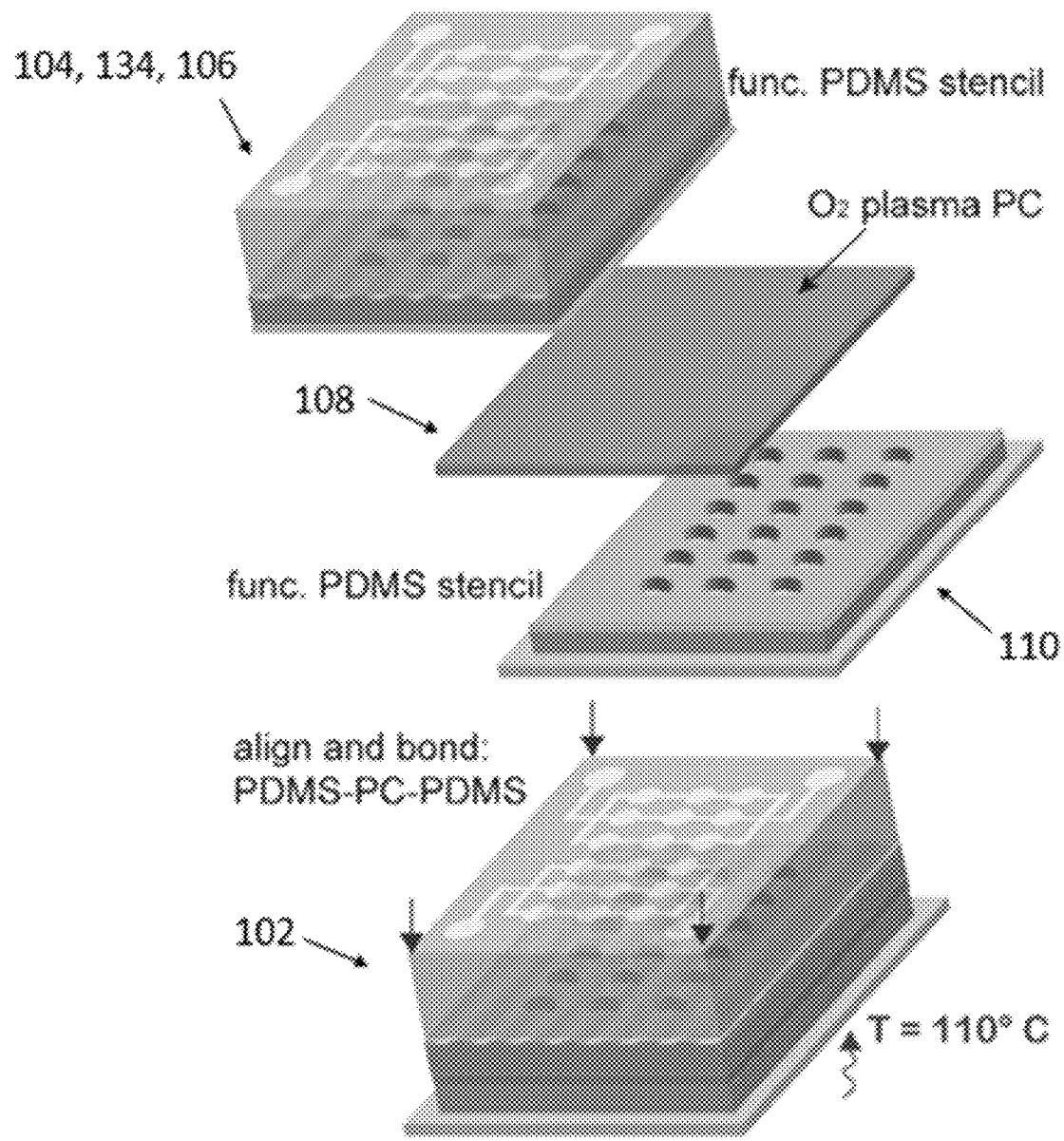

FIGS. 3-5 each shows an example fabrication step of making the multi-layer microfluidic device or the LCAD 102 of the cell analysis system 100 of FIG. 1. The multi-layer microfluidic device or the LCAD 102 is fabricated such that it is capable of performing several functions in one device. For example, the fabrication steps include surface chemistry modification, precise alignment, and bonding of multiple layers composed of different materials. In particular, fabrication of the multi-layer microfluidic device or the LCAD 102 include three steps: (i) soft lithography of polydimethylsiloxane (PDMS) microchannels and microwells, (ii) gold (Au) deposition of embedded electrodes, and (iii) alignment and bonding of the multiple layers using surface chemistry treatments.

In the first step (i) (FIG. 3), two molds having the microwell features are prepared using photolithography steps in a clean-room environment. Briefly, a negative photoresist layer (SU-8 2050, a high contrast, epoxy based photoresist available from Microchem) is spin-coated, UV-exposed, and developed on a clean Si wafer according to the manufacturer specifications to achieve 50 μm thick features (for the layer of microwells 106). The mold is then coated with a 500-nm layer of Parylene-C (the second commercially available member of the Parylene series, is produced from the same raw material (dimer) as Parylene N, modified only by the substitution of a chlorine atom for one of the aromatic hydrogens) to reduce the surface friction of the mold and facilitate the release of PDMS. The PDMS (SYLGARD™ 184, available from Dow Corning) elastomer solution is prepared by mixing a 10:1 (w/w) elastomer to curing agent mixture and degassed in a desiccator for 30 minutes. Through-hole stencils for the micro-well layers are fabricated by pouring the PDMS mixture on the mold, covering it with a mylar sheet (polyester film made from polyethylene terephthalate (PET) or BoPET (biaxially-oriented polyethylene terephthalate) available from TAP Plastics), and clamping it at 80° C. for 60 minutes. The mylar transfer sheet is coated with a Pt-chelating aminosilane, AEAPS available from Sigma-Aldrich, that inhibits the polymerization of PDMS between the top of the mold and the surface of the sheet and resulted in through-hole features. In the second step (ii) (FIG. 3), a 100-nm Au layer, e.g., the conductive layer 134, is deposited by e-beam evaporation on top of the microwell layer, e.g., the layer of microwells 106, in order to apply a uniform electric field across each of the wells.

Following fabrication of the layers, the device is assembled as depicted in FIGS. 4 and 5. Two surface chemistry treatments are performed to covalently bond the Au-coated micro-wells (e.g., the conductive layer 134 and the layer of microwells 106) with the PDMS microchannels (e.g., the layer of microfluidic channels 104) and to covalently bond the PC membrane (e.g., the membrane 108) containing nanochannels (e.g., the nanochannels 116) with the PDMS micro-well and extraction chamber surfaces (e.g., the microwells 122 and the layer of extraction chambers 110). The Au-coated layer is then placed in a 25 millimolar (mM) solution of a thiol-terminated silane, mercaptopropyl (trimethoxysilane) (MPTMS, Sigma-Aldrich) in ethanol solution for 180 minutes and air dried. Simultaneously, the PDMS microchannel layer (e.g., the layer of microfluidic channels 104) is prepared by pouring the PDMS mixture on the mold and partially curing in a convection oven at 75° C. for 20 minutes.

Following the MPTMS treatment, the Au-coated microwell layer (e.g., the conductive layer 134 and the layer of microwells 106) is aligned with the PDMS microchannels (e.g., the layer of microfluidic channels 104), bonded at 75° C. for 120 mins, and placed in room temperature for 12 hours. Both PDMS micro-well and extraction chamber layers (e.g., the microwells 122 and the layer of extraction chamber 110) are then functionalized with AEAPS in a 1% (v/v) aqueous solution for 20 minutes. A 25 μm thick PC membrane (available from Sterlitech) (e.g., the membrane 108) is oxygen plasma treated for 2 minutes and placed on the AEAPS treated micro-well layer (e.g., the layer of microwells 106). Lastly, the remaining side of the PC membrane (e.g., the membrane 108) is oxygen plasma treated for 2 minutes, aligned to the extraction chamber layer (e.g., the layer of extraction chambers 110), and bonded at 110° C. for 120 minutes. The fully assembled device is tested for leaks and electrical conductivity prior to experimentation.

Figure 6:
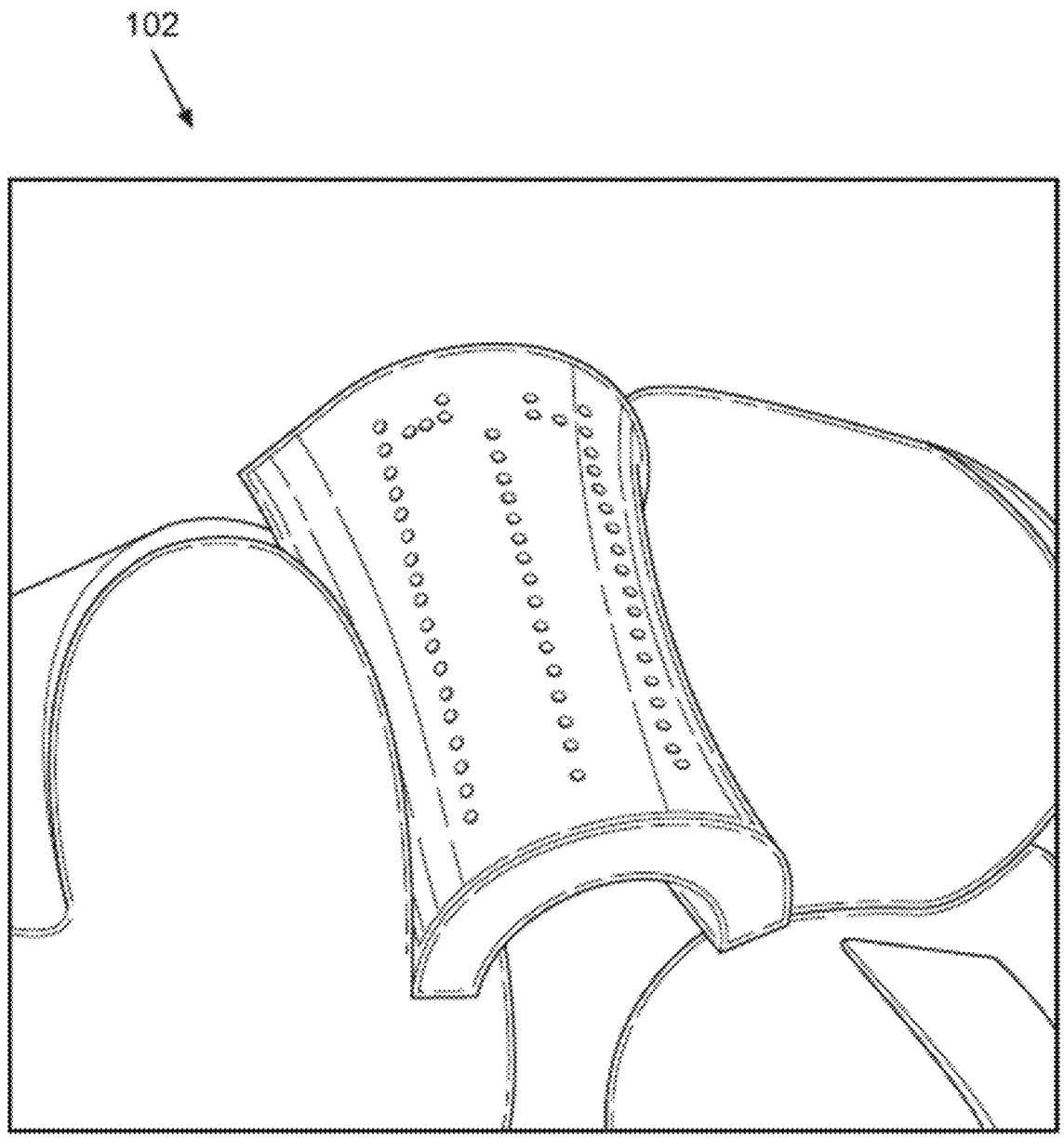
FIGS. 6-7 each shows an image of an example multi-layer microfluidic device or LCAD of the cell analysis system of FIG. 1.
Figure 7:
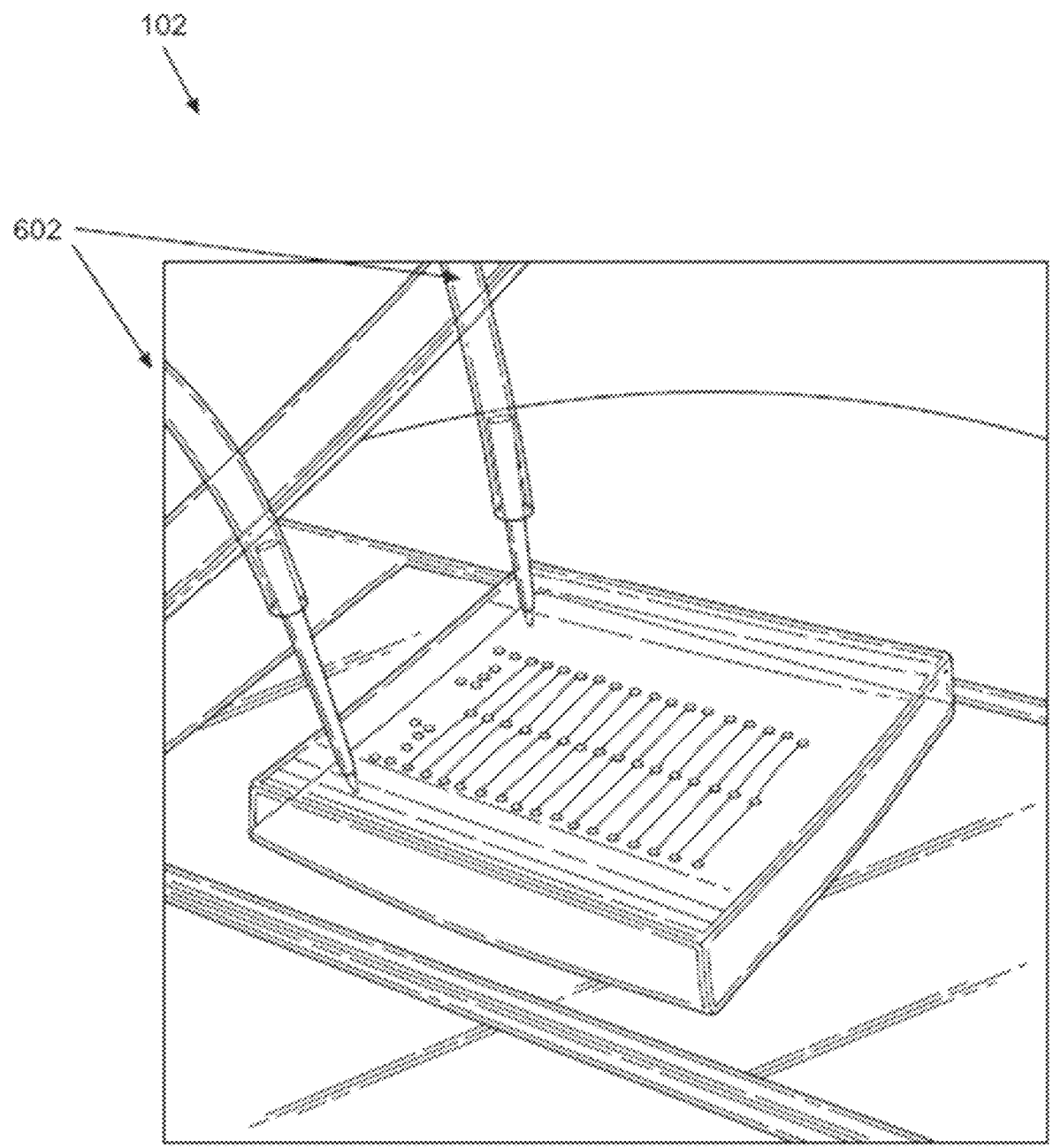

FIGS. 6 and 7 show images of the multi-layer microfluidic device or the LCAD 102 of the cell analysis system 100 of FIG. 1. With reference to FIG. 6, the multi-layer microfluidic device or the LCAD 102 includes embedded flexible gold electrode. With reference to FIG. 7, the multi-layer microfluidic device or the LCAD 102 is in operation with inlets connected to fluidic tubing 602. The multi-layer microfluidic device or the LCAD 102 is tested for leaks, and no leak is observed even at high applied flow rates (flow rate, Q>200 μl/min). Furthermore, the multi-layer microfluidic device or the LCAD 102 remains conductive (electrical resistance about 10 Ohms) during all assembly steps indicating a successful integration of the electrodes in the multilayer architecture.

Figure 8:
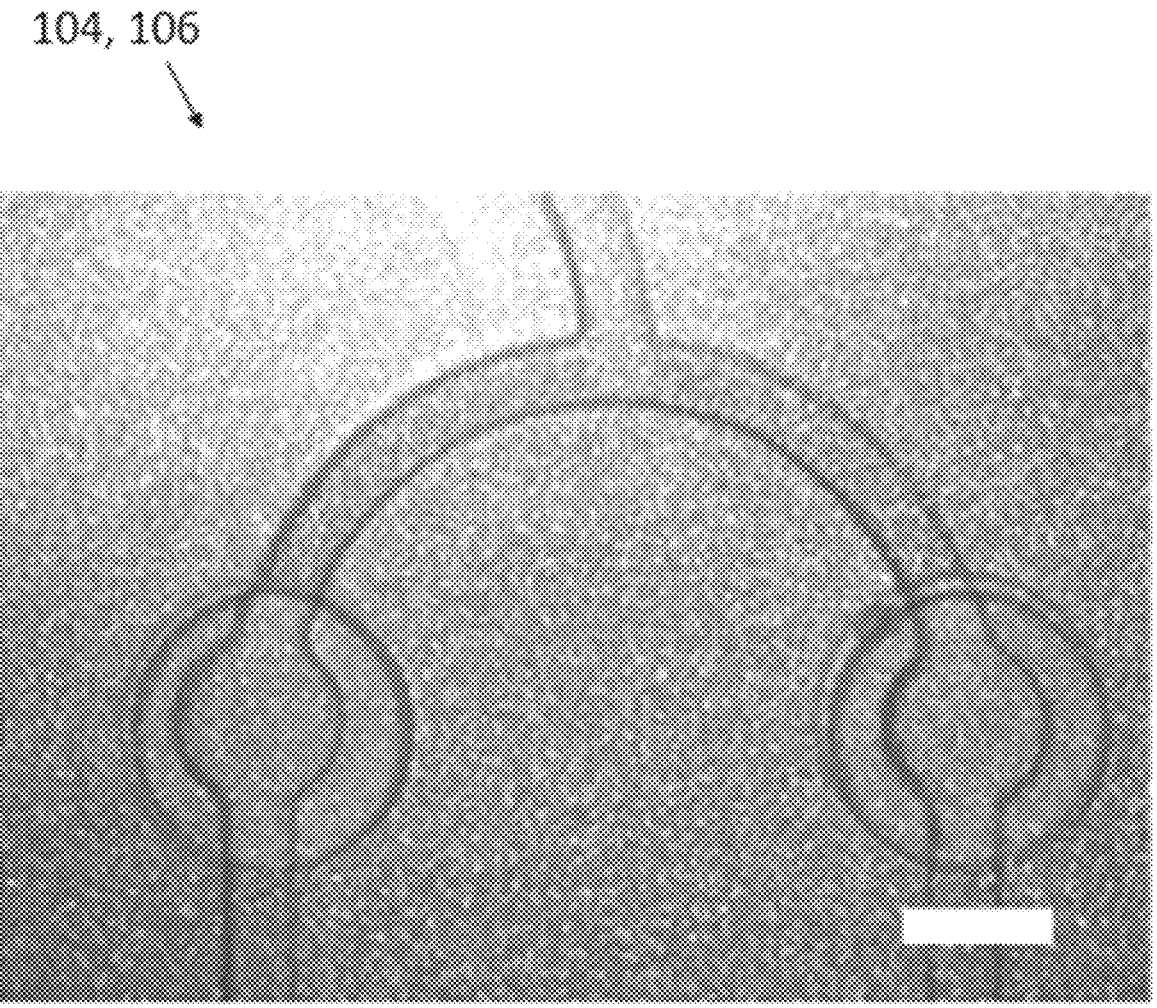
FIG. 8 is a micrograph of microfluidic channels and microwells in an example multi-layer microfluidic device or LCAD of the cell analysis system of FIG. 1.

FIG. 8 shows micrograph of channels and wells in an assembled multi-layer microfluidic device or the LCAD 102. In FIG. 8, the scale bar=150 μm (RT=Room Temperature). After embedding the Au electrodes in the microfluidic device, the two PDMS microwell surfaces (e.g., the microwells 106 and the layer of the extraction chamber 110) are treated with an aminosilane, aminoethylaminopropyl (trimethoxysilane) (AEAPS), and bonded to the PC membrane (e.g., the membrane 108). The fully assembled multi-layer microfluidic device or the LCAD 102 is tested for leaks and electrical conductivity prior to experimentation and is found to withstand flow rates ten-fold higher than required for experiments without leakage.

Cell Culture

To demonstrate on-chip cell culture, the fabricated devices (e.g., the multi-layer microfluidic device or the LCAD 102) are sterilized by placing in 70% ethanol for 15 minutes and washing with deionized water. The devices are then dried and exposed to UV for 45 minutes (min). In order to enhance cell adhesion, the microchannels (e.g., the layer of microfluidic channels 104) are flushed with a solution of extra-cellular matrix proteins (e.g. 1:50 (v/v) solution of 0.1% fibronectin for HEK 293 cells or vitronectin for induced pluripotent stem cells in phosphate buffered saline) using a syringe pump (available from New Era).

The devices (e.g., the multi-layer microfluidic device or the LCAD 102) are then incubated overnight at 4° C. to coat the PC membrane (e.g., the membrane 108) surface with the matrix protein. The microchannels (e.g., the layer of microfluidic channels 104) are then washed with PBS (balanced salt solution, PBS available from Gibco™) three times to remove unattached residues. The cells are introduced into the microchannel (e.g., the layer of microfluidic channels 104) at a density of 2-10 million per milliliter (million/ml) in cell culture media at a flow rate of 0.2-2 microliter per minute (μl/min). The flow is then stopped for 10 mins during which the cells (e.g., the cells 112) settled down into the PDMS microwells (e.g., the microwells 106). Excess cells in the microchannels are removed by washing with cell culture media.

The devices (e.g., the multi-layer microfluidic device or the LCAD 102) are then placed in 6-well plates (available from USA Scientific) and submerged in cell culture media. The media could diffuse to the cells (e.g., the cells 112) through the nanochannels (e.g., the layer of microfluidic channels 104) in the PC membrane (e.g., the membrane 108). The well plates are placed inside an incubator (at 37° C. with 5% $CO_2$) for 12-36 hours to allow for cell adhesion and spreading before carrying out the electroporation experiments. Cell culture media in each well is replenished every 12-24 hours. Depending on the micro-well diameter, and the cell seeding density, 1-200 cells are cultured in each microwell (e.g., the microwells 106).

To determine the applied flow rate necessary for efficient capture, a suspension (5E6 cells/ml) of td-Tomato expressing MDA-MB231 cells is introduced into an LCAD (e.g, the multi-layer microfluidic device or the LCAD 102) having wells of a fixed culture-well diameter ($D_W$=250 μm) with various flow rates (Q=0.1 to 2 μl/min with 0.1 μl/min increments). Cell trapping is observed for flow rates below a certain threshold value (Q=0.5 μl/min) in accordance with CFD simulation results. Next, cells (5E6 cells/ml and Q=0.3 μl/min) are seeded into culture-wells of various diameters ($D_W$=100, 250, and 350 μm) and the number of cells in each well (e.g., the microwells 106) is counted. Adjusting the culture-well diameter provides control over the average number of cells captured in the wells (e.g., the microwells 106), and enables customization of the device (e.g., the multi-layer microfluidic device or the LCAD 102) according to the experiment and application of interest. For sampling applications, the culture-well diameter must be selected to enable culture of the appropriate number of cells to exceed the limit of detection of the assay.

Figure 9:
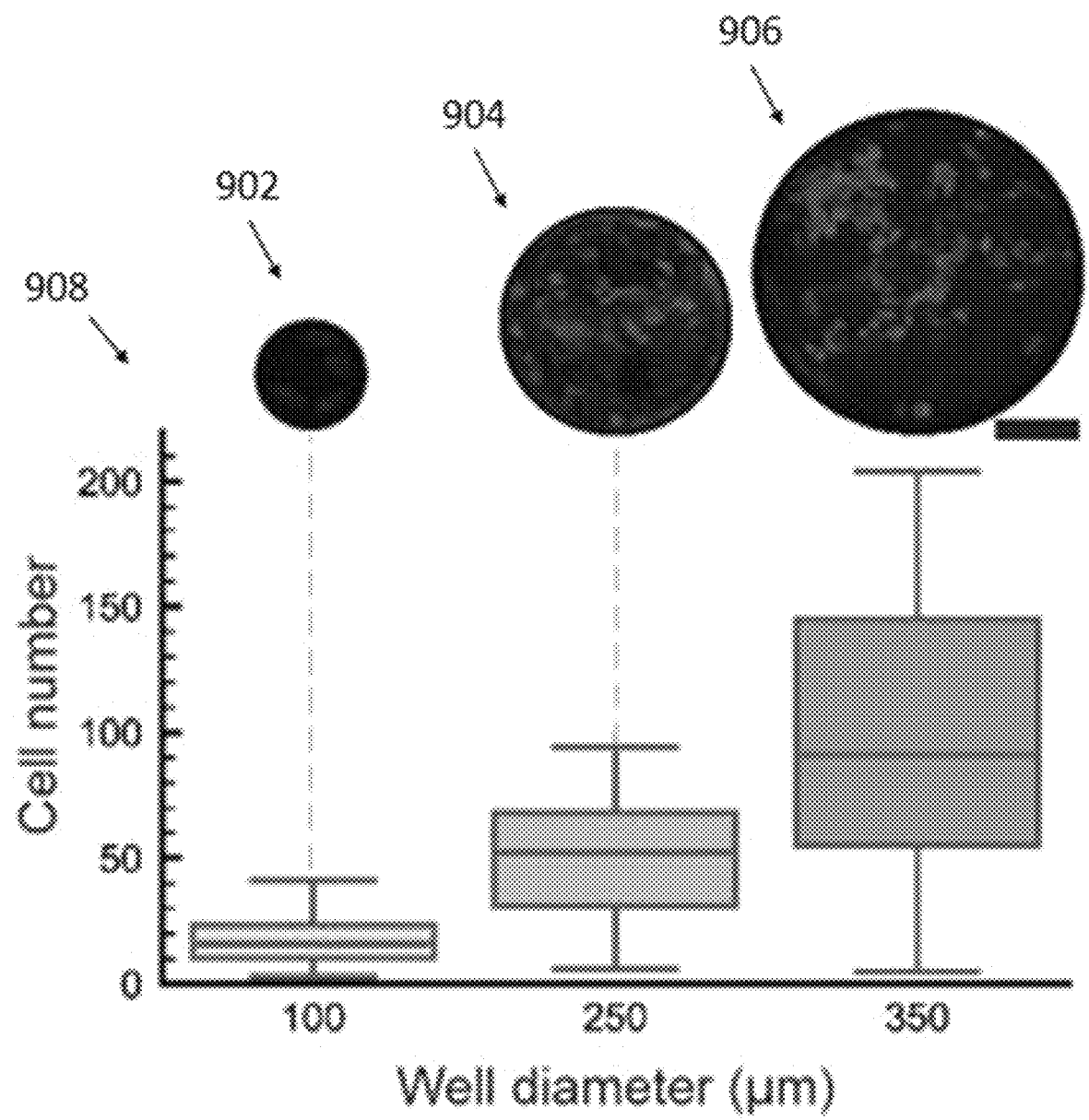
FIG. 9 shows cell culture in an example multi-layer microfluidic device or LCAD of the cell analysis system of FIG. 1.

FIG. 9 shows cell culture in an example multi-layer microfluidic device of the cell analysis system or the LCAD 102 based on the cell culture method discussed above. The micrographs 902, 904, and 906 at the top of FIG. 9 show cells seeded in culture-wells with different diameters: 100 μm, 250 μm, and 350 μm (scale bar=75 μm), respectively. The box plot 908 at the bottom of FIG. 9 compares cell number to well diameter ($n_{100}$=46, $n_{250}$=44, $n_{350}$=101, box plot includes minimum, maximum, and first and third quartiles).

Figure 10:
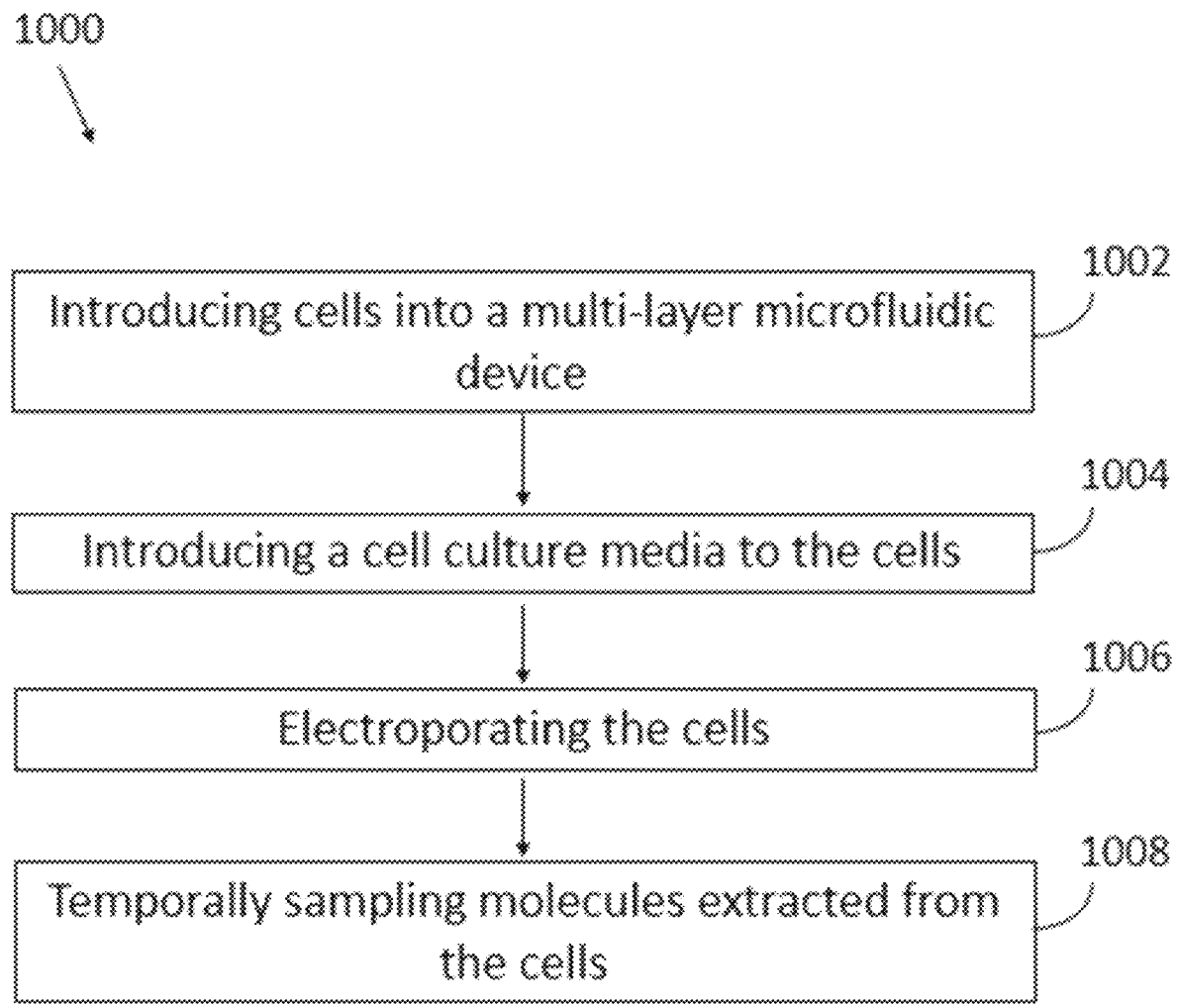
FIG. 10 shows an example method of performing cell analysis using the cell analysis system of FIG. 1.

FIG. 10 shows an example method 1000 of performing cell analysis using the cell analysis system 100 of FIG. 1. The method 1000 includes introducing cells into a multi-layer microfluidic device (step 1002) and introducing a cell culture media to the cells (step 1004). The method 1000 includes electroporating the cells (step 1006) and temporally sampling molecules extracted from the cells (e.g., sampling at multiple time instances) (step 1008).

Electroporation

For electroporating the cells, a function generator, e.g., the function generator 136 (available from Agilent) connected to a voltage amplifier (OPA445, available from Texas Instruments) may be used to apply the electroporation pulses (bi-level pulses with voltage: 20 volts (V)-40V for level 1 and 5V-15V for level 2; pulse width: 0.25 milliseconds (ms)-1 ms for level 1 and 1 ms-3 ms for level 2; frequency: 5-200 Hertz (Hz); number of pulses: 100-1000 pulses) to the multi-layer microfluidic device or the LCAD 102. The voltage traces may be verified on an oscilloscope (available from Agilent). The top and bottom ITO-coated glass slides, e.g., the top conductive layer 118 and the bottom conductive layer 120 (available from Nanocs) serve as the ground and positive electrodes for pulse application, respectively. The appropriate buffers are introduced into the top microchannels, e.g., the layer of microfluid channels 104) and the bottom microchambers, e.g., the extraction chambers 110, of the multi-layer microfluidic device or LCAD 102. Then the multi-layer microfluidic device or LCAD 102 is aligned between the two conductive ITO slides, e.g., the top conductive layer 118 and the bottom conductive layer 120. Once aligned, the assembly is mechanically secured using custom-made clamps. The two electrodes are then connected to the function generator, e.g., the function generator 136, and the desired electroporation pulse train is applied.

Delivery of Molecular Cargo

Figure 11:
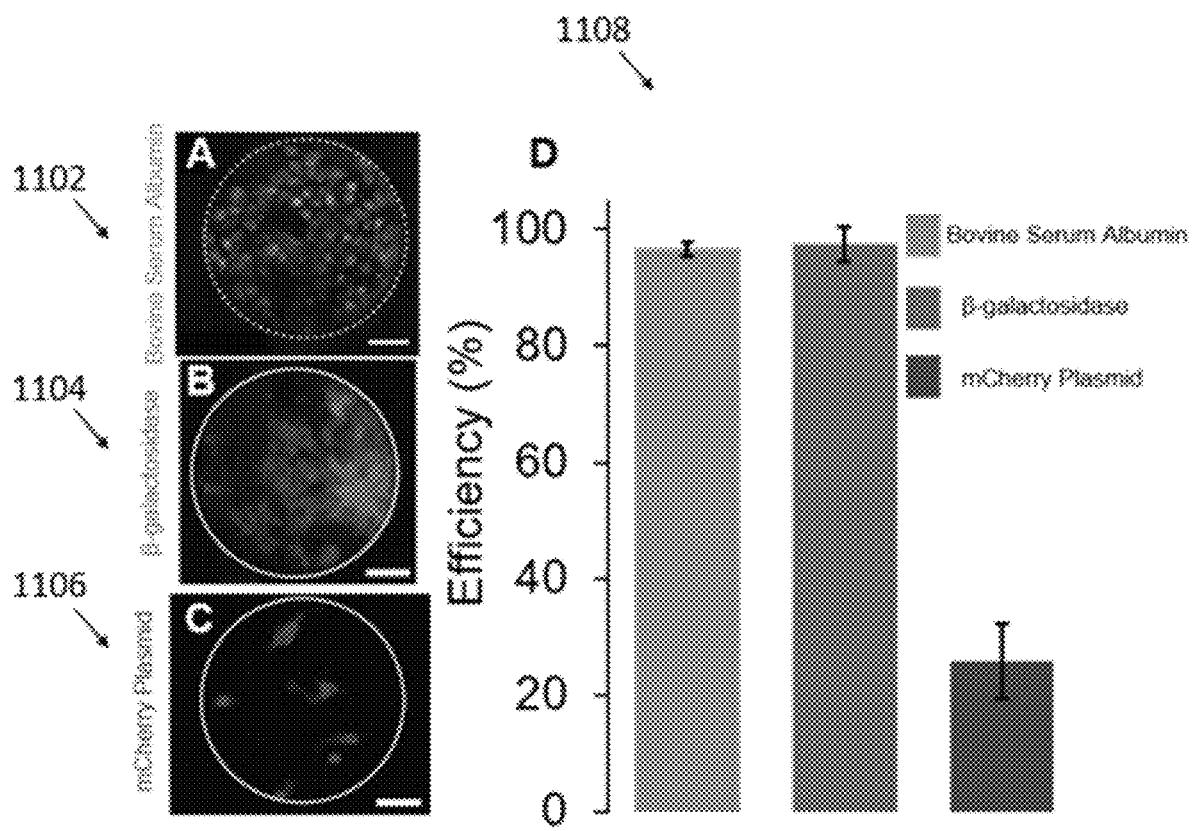
FIG. 11 are fluorescent micrographs and a plot showing delivery of molecular cargo in cells using the cell analysis system of FIG. 1.

FIG. 11 are fluorescent micrographs 1102, 1104, and 1106 and a plot 1108 showing delivery of molecular cargo in cells using the cell analysis system 100. About 100 μl of the cargo solution (e.g. plasmid DNA or protein) is pipetted onto the bottom extraction chambers, e.g., the extraction chamber 110 of the multi-layer microfluidic device or LCAD 102 seeded with cells. The top microchannels, e.g, the microfluidic channels 104, are filled with electroporation buffer (available from Eppendorf) using a syringe pump. The multi-layer microfluidic device or LCAD 102 is then sandwiched between the two ITO slides, e.g., the top conductive layer 118 and the bottom conductive 120, ensuring that there is fluid between the slides and the device for proper electrical contact.

Electroporation is then carried out using the protocol discussed before. After 10 minutes of incubation at room temperature, the cells are washed by flowing PBS (Gibco™) through the microchannels, e.g., the microfluidic channels 104, to remove residues. Cell culture media is reintroduced into the microchannels, e.g., the microfluidic channels 104, post electroporation. Analysis for successful delivery or protein expression in cells can be performed using standard assays such as microscopy, flow cytometry, qPCR, sequencing, etc.

FIG. 11 demonstrates successful delivery of proteins (e.g., bovine serum albumin or BSA) and a large enzyme complex or DNA plasmids (e.g., β-galactosidase and a plasmid encoding for fluorescent mCherry) into cells (MDA MB 231 for the proteins and HEK 293 for the plasmid) with high efficiency. The fluorescent micrographs 1102, 1104, and 1106 of BSA, β-galactosidase (magenta), and mCherry-plasmid, respectively. All scalebars in the micrographs 1102, 1104, and 1106 are 75 µm. The plot 1108 shows the efficiency.

The fluorescent BSA is loaded in the bottom microchambers, e.g., the layer of extraction chambers 110, at a concentration of 2.5 milligram per milliliter (mg/ml) in PBS and a train of bi-level electric pulses is applied across the device, e.g., the multi-layer microfluidic device or LCAD 102. The cell culture media is replaced by a hypo-osmolar electroporation buffer during the localized electroporation process, which has been previously shown to enhance the efficiency and uniformity of delivery. It is observed that the BSA delivery in the cells cultured on the membranes, e.g., the membrane 108, is uniform and with high efficiency (96.6±1.2%).

A solution containing the enzyme complex, β-galactosidase (464 kDa) tagged with a fluorescent dye (AF-647), is loaded in the bottom microchambers, e.g., the layer of extraction chamber 110, (Au-coated, $\Phi=3.0\times10^8$ nanochannels/cm$^2$, $D_p=200$ nm) seeded with MDA-MB231 cells, and a series of electric pulses ($V_{supply}=30$ V, $N_{pulses}=400$, and f=20 Hz) is applied. The multi-layer microfluidic device or LCAD 102 is incubated for 10 minutes after the application of the electric pulses to allow enough time for the enzymes to diffuse into the cells, and subsequently imaged the wells using fluorescent microscopy. The high delivery efficiency of the β-galactosidase enzyme (97.4% of cells) indicates that cells are electroporated with high uniformity within each well and throughout the entire device.

To test the efficiency of transfection, mCherry-encoding DNA plasmid (insert size about 4 kb) is loaded in the bottom microchambers, e.g., the layer of extraction chamber 11, (Au-coated, $\Phi=2.0\times10^7$ nanochannels/cm$^2$, $D_p=200$ nm) seeded with HEK293 cells and applied the same electric pulse conditions. The wells are imaged after a 24-hour incubation period to enable time for the HEK293 cells to express the mCherry protein. Transfection of the mCherry plasmid DNA is successful in 25.9% of the cells. Further tuning of the voltage parameters can optimize plasmid delivery and integration, as plasmid transfection may be sensitive to dosage amounts.

Temporal Sampling

Figure 12:
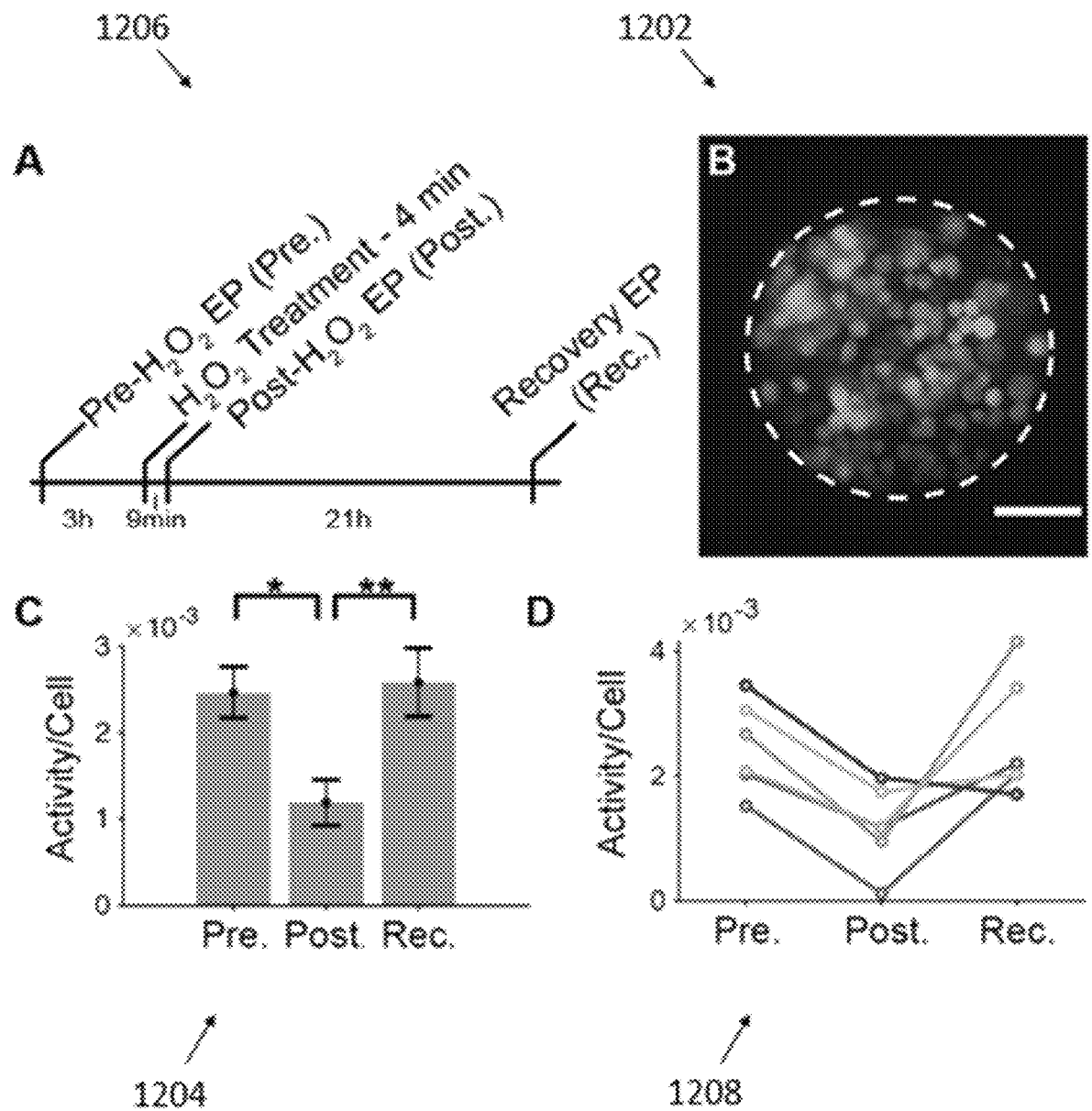
FIG. 12 are a fluorescent micrograph and plots showing temporal sampling of cellular cytosol using the cell analysis system of FIG. 1 and quantification of protein tyrosine phosphatase (PTP) activity using self-assembled monolayers for matrix-assisted laser deposition/ionization (SAMDI).

FIG. 12 are a fluorescent micrograph 1202 and plots 1204, 1206, and 1208 showing temporal sampling of cellular cytosol using the cell analysis system of FIG. 1 and quantification of protein tyrosine phosphatase (PTP) activity using self-assembled monolayer desorption ionization (SAMDI). The plot 1206 shows a timeline for sampling with electroporation (EP) and $H_2O_2$ treatment. The fluorescent micrograph 1202 shows cells 24 hours after final sampling, labeled with Hoechst (blue) and calcein AM (green), and the scalebar is 100 µm. The plot 1204 shows protein tyrosine phosphatase (PTP) activity per cell measured before (Pre.), shortly after (Post.) and 21 hours after $H_2O_2$ treatment. For data shown in the plot 1204, the sample size N is 6, the p-value is 0.005 between Pre. And Post. (e.g., indicated with symbol "*"), and the p-value is 0.01 between Post. and Rec. (e.g., indicated with symbol "**"), and the error bars represent the standard error of the mean (s.e.m.). Herein p-value is the probability that a particular statistical measure, such as the mean or standard deviation, of an assumed probability distribution will be greater than or equal to (or less than or equal to in some instances) observed results. In the plot 1208, each line represents the activity per cell of a single well at the three time points.

The cells are typically seeded and cultured in the multi-layer microfluidic device or LCAD 102 for 12-36 hours before sampling. The cell culture media in the multi-layer microfluidic device or LCAD 102 is then replaced with electroporation buffer by flowing in the buffer at 2 µl/min using a syringe pump. In one embodiment, sampling of the cytosol is followed by analysis of protein tyrosine phosphatase (PTP) enzymatic activity using the SAMDI-MS assay in MDA-MB 231 cells. For this, 100 µl of SAMDI buffer (20 mM Tris, pH 8, 136 mM NaCl, 1 mM EDTA, 400 µM tris (2-carboxyethyl) phosphine hydrochloride (Sigma), 1 complete mini EDTA-free protease inhibitor cocktail tablet per 10 mL buffer) is pipetted onto the bottom microchambers, e.g., the layer of extraction chambers 110, of the multi-layer microfluidic device or LCAD 102 and the device is sandwiched between the top ITO slide (e.g., the top conductive layer 118) and the bottom SAMDI slide (e.g., the bottom conductive layer 120 including the one or more surface-based sensors 130 including SAMDI-MS assay). Then the functionalized SAMDI gold spots on the ITO slide (e.g., the bottom conductive layer 120) are aligned to the bottom microchambers (e.g., the layer of extraction chambers 110) of the device under a stereomicroscope. After alignment, electroporation is carried out according to the protocol described earlier. Following this, the assembly is transferred to the incubator (at 37° C. with 5% $CO_2$) to allow for the extracted enzymes to act on the SAMDI substrate, e.g., the one or more surface-based sensors 130. The SAMDI slide is detached and analyzed after 1 hour of incubation. Finally, the multi-layer microfluidic device or LCAD 102 is replenished with fresh cell culture media, submerged in a 6-well plate filled with cell culture media and transferred to the incubator for future analysis. For temporal sampling (sampling from the same cells at multiple timepoints), the protocol is repeated 4-24 hours after the first electroporation and sampling cycle.

The example study discussed above demonstrates the combination of treatment of the cells in the multi-layer microfluidic device or LCAD 102 with a compound, followed by sampling and enzymatic activity analysis at multiple timepoints to determine the temporal effect of the treatment. The effect of hydrogen peroxide on protein tyrosine phosphatase (PTP) activity is evaluated. A baseline measurement of activity is obtained with the electroporation procedure, then the device is incubated an additional two hours. After this period, 2 mM hydrogen peroxide in media is loaded into the microchannels, e.g., the microfluidic channels 104, for 4 minutes. The solution is replaced with the electroporation buffer, and cells are sampled again. The cells are then rested and sampled a third time after 21 hours. Since PTP activity is reduced in response to oxidation by hydrogen peroxide, the PTP activity decreases from the sampled cytosol post treatment. The activity is observed to recover after 21 hours to the baseline levels.

Measurement of the activity before treatment acts as a baseline readout of activity to which post-treatment measurements from the same populations of cells can be compared. The multi-layer microfluidic device or LCAD 102 is used to measure the effects of hydrogen peroxide ($H_2O_2$), a reactive oxygen species involved in PTP regulation, on PTP activity at multiple timepoints. PTP active sites contain a catalytic cysteine residue that can be reversibly oxidized to sulfenic acid or related states, or irreversibly oxidized to sulfinic acid or sulfonic acid derivatives and are inactive in their oxidized states.

Upon loading the microfluidic channels 104 and treating the cells with 2 mM $H_2O_2$, a second sampling is performed. For wells with greater than 20% activity at the first time point, a reduction in average PTP activity per cell of 55% (P-value=0.005) is observed following $H_2O_2$ treatment as shown in the plot 1204 of FIG. 12. Such reduction may be contributed by oxidation and inactivation of PTPs by $H_2O_2$. The viability of cells is measured and treated with 2 mM $H_2O_2$ and high levels of viability (99.7%) is observed, which indicates that the reduction in activity is not due to cell death. As a control sample, the PTP activity in a device that is not treated with $H_2O_2$ is studied. For the control sample, the average activity measured at the second time point is 23% below the activity at the first time point. This suggests that part of the reduction in activity may be due to the first electroporation.

Oxidation by $H_2O_2$ can be reversible or irreversible, resulting in varying degrees of recovery of PTP activity over time. To assess PTP activity recovery, the cells are cultured for an additional 21 hours before sampling them again. It is observed that the activity significantly increases (p-value=0.01) relative to the post-treatment measurement, to a level that is 5% higher than the original mean activity, and i not significantly different than the original measurement (p-value=0.77) shown in the plot 1206 of FIG. 12. When examining the data for each well at each time point, it is observed that all of the wells show a large reduction in activity after $H_2O_2$ treatment, and most show at least a partial recovery of activity by the next day as shown in the plot 1208 of FIG. 12. The viability of the cells 24 hours after the final sampling again shows high levels of viability as in the plot 1202 of FIG. 12.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A cell analysis system comprising:
a multi-layer microfluidic device comprising:
 a first side and a second side;
 a microfluidic channel;
 a first layer including a plurality of microwells disposed underneath the microfluidic channel and in fluidic communication with the microfluidic channel, wherein each microwell of the plurality of microwells is configured to culture one or more cells;
 an intermediate conductive layer disposed on top of the plurality of microwells;
 a second layer including a plurality of extraction chambers disposed underneath the first layer wherein each microwell of the plurality of microwells is substantially concentric with a corresponding extraction chamber of the plurality of extraction chambers; and
 a membrane disposed between the first layer and the second layer, wherein the membrane has a plurality of nanochannel pores enabling the plurality of microwells to fluidically communicate with the plurality of extraction chambers;
 a top conductive layer disposed on the first side of the multi-layer microfluidic device and a bottom conductive layer disposed on the second side of the multi-layer microfluidic device wherein the second layer is opposite to the first side such that the multi-layer microfluidic device is sandwiched between the top conductive layer of the cell analysis system and the bottom conductive layer of the cell analysis system;
 one or more sensors disposed on the bottom conductive layer, projecting into each extraction chamber of the plurality of extraction chambers and for analyzing intracellular contents in the plurality of extraction chambers originating from the plurality of microwells and diffusing into the plurality of extraction chambers through the plurality of nanochannel pores; and
wherein the cell analysis system further comprises:
 a function generator configured to apply an electroporation pulse to the one or more cells within the plurality of microwells between the top conductive layer and the bottom conductive layer, wherein the intermediate conductive layer disposed on top of the plurality of microwells is configured to enhance electrical conductivity and minimize electric field losses in the microfluidic channel when the electroporation pulse is applied.

2. The cell analysis system of claim 1 wherein the intracellular contents comprise a protein, RNA, plasmid DNA, a metabolite, or a combination thereof.

3. The cell analysis system of claim 1 wherein the one or more sensors comprise plasmon-resonance-based sensors.

4. The cell analysis system of claim 1 wherein the microfluidic channel comprises a self-assembled monolayer for performing a desorption ionization mass spectrometry assay, and the bottom conductive layer comprises an indium titanium oxide coated slide with gold patterns interfacing with the plurality of extraction chambers.

5. The cell analysis system of claim 1 wherein each nanochannel of the plurality of nanochannel pores is about 100 nm to 400 nm in diameter and the membrane has a nanochannel pore density between about $2 \times 10^6$ pores per centimeter squared (pores/cm$^2$) and about $5 \times 10^8$ pores/cm$^2$.

6. The cell analysis system of claim 1 wherein the top conductive layer and the bottom conductive layer comprise indium titanium oxide.

7. The cell analysis system of claim 1 wherein the microfluidic channel, the first layer, and the second layer are formed using a soft lithography of polydimethylsiloxane technique.

8. The cell analysis system of claim 1 wherein the intermediate conductive layer of the multi-layer microfluidic device is about 100 nm in thickness.

9. The cell analysis system of claim 1 wherein the one or more sensors comprise plasmon-resonance-based sensors.

10. The cell analysis system of claim 1 wherein the conductive layer comprises gold.

11. The cell analysis system of claim 1 wherein the membrane comprises polycarbonate and is optionally coated with a protein matrix.

* * * * *